US007083517B2

(12) United States Patent
Salerno

(10) Patent No.: US 7,083,517 B2
(45) Date of Patent: Aug. 1, 2006

(54) REMOTE WAGERING SYSTEM

(75) Inventor: Victor J. Salerno, Henderson, NV (US)

(73) Assignee: American Wagering, Inc., Las Vegas, NV (US)

( * ) Notice: Subject to any disclaimer, the term of this patent is extended or adjusted under 35 U.S.C. 154(b) by 0 days.

(21) Appl. No.: 10/197,221

(22) Filed: Jul. 17, 2002

(65) Prior Publication Data

US 2003/0022718 A1 Jan. 30, 2003

Related U.S. Application Data

(60) Provisional application No. 60/306,000, filed on Jul. 17, 2001.

(51) Int. Cl.
*A63F 13/12* (2006.01)

(52) U.S. Cl. ............................ 463/29; 463/39; 463/41; 463/42

(58) Field of Classification Search .................... 463/1, 463/11–43; 273/269, 109 R
See application file for complete search history.

(56) References Cited

U.S. PATENT DOCUMENTS

| | | | | | |
|---|---|---|---|---|---|
| 4,322,612 | A | * | 3/1982 | Lange | 463/28 |
| 4,339,798 | A | * | 7/1982 | Hedges et al. | 463/26 |
| 4,494,197 | A | * | 1/1985 | Troy et al. | 463/18 |
| 4,644,351 | A | * | 2/1987 | Zabarsky et al. | 340/7.21 |
| 4,842,278 | A | * | 6/1989 | Markowicz | 463/18 |
| 5,083,272 | A | * | 1/1992 | Walker et al. | 463/25 |
| 5,122,050 | A | * | 6/1992 | Gellert | 425/549 |
| 5,297,205 | A | * | 3/1994 | Audebert et al. | 380/251 |
| 5,324,035 | A | * | 6/1994 | Morris et al. | 463/42 |
| 5,349,633 | A | * | 9/1994 | Katz | 379/88.09 |
| 5,618,232 | A | * | 4/1997 | Martin | 463/25 |
| 5,768,382 | A | * | 6/1998 | Schneier et al. | 380/251 |
| 5,779,545 | A | * | 7/1998 | Berg et al. | 463/22 |
| 5,787,173 | A | * | 7/1998 | Seheidt et al. | 380/277 |
| 5,832,071 | A | * | 11/1998 | Voelker | 379/165 |
| 5,851,149 | A | * | 12/1998 | Xidos et al. | 463/42 |
| 5,902,983 | A | | 5/1999 | Crevelt et al. | 235/380 |
| 5,907,596 | A | * | 5/1999 | Karnowski | 379/88.21 |
| 5,910,048 | A | | 6/1999 | Feinberg | 463/25 |
| 5,921,865 | A | * | 7/1999 | Scagnelli et al. | 463/17 |
| 5,970,143 | A | * | 10/1999 | Schneier et al. | 713/181 |
| 5,999,808 | A | * | 12/1999 | LaDue | 455/412.2 |
| 6,011,485 | A | * | 1/2000 | Wicks | 340/7.23 |
| 6,011,835 | A | * | 1/2000 | Rathore et al. | 379/93.13 |
| 6,024,640 | A | * | 2/2000 | Walker et al. | 463/17 |
| 6,024,641 | A | * | 2/2000 | Sarno | 463/17 |
| 6,099,408 | A | * | 8/2000 | Schneier et al. | 463/29 |
| 6,104,815 | A | * | 8/2000 | Alcorn et al. | 380/251 |
| 6,113,493 | A | | 9/2000 | Walker et al. | 463/25 |
| 6,142,876 | A | | 11/2000 | Cumbers | 463/25 |

(Continued)

FOREIGN PATENT DOCUMENTS

GB 2 393 806 A * 7/2004

*Primary Examiner*—Xuan M. Thai
*Assistant Examiner*—Matthew D. Hoel
(74) *Attorney, Agent, or Firm*—Wallenstein & Wagner, Ltd.

(57) ABSTRACT

A system and method for permitting a wagerer to remotely place a wager is disclosed. The wagerer remotely contacts a ticket writer or computerized system. The ticket writer or computerized system generates a random number and sends the random number to the wagerer via a local pager. The wagerer remotely contacts the ticket writer or computerized system, and instructs the ticket writer or computerized system of the wagerer's desired wager and the random number.

20 Claims, 3 Drawing Sheets

U.S. PATENT DOCUMENTS

| | | | | |
|---|---|---|---|---|
| 6,173,209 | B1 * | 1/2001 | Laval et al. | 700/91 |
| 6,193,605 | B1 * | 2/2001 | Libby et al. | 463/17 |
| 6,254,480 | B1 * | 7/2001 | Zach | 463/17 |
| 6,254,482 | B1 | 7/2001 | Walker et al. | 463/25 |
| 6,264,557 | B1 | 7/2001 | Schneier et al. | 463/29 |
| 6,325,716 | B1 * | 12/2001 | Walker et al. | 463/17 |
| 6,347,738 | B1 | 2/2002 | Crevelt et al. | 235/380 |
| 6,383,078 | B1 * | 5/2002 | Yacenda | 463/41 |
| 6,416,414 | B1 * | 7/2002 | Stadelmann | 463/42 |
| 6,454,650 | B1 * | 9/2002 | Aronin | 463/17 |
| 6,497,408 | B1 * | 12/2002 | Walker et al. | 273/138.1 |
| 6,508,710 | B1 * | 1/2003 | Paravia et al. | 463/42 |
| 6,549,912 | B1 * | 4/2003 | Chen | 707/104.1 |
| 6,592,460 | B1 * | 7/2003 | Torango | 463/27 |
| 6,682,421 | B1 * | 1/2004 | Rowe et al. | 463/25 |
| 6,699,125 | B1 * | 3/2004 | Kirmse et al. | 463/42 |
| 6,702,672 | B1 * | 3/2004 | Angell et al. | 463/25 |
| 6,719,631 | B1 * | 4/2004 | Tulley et al. | 463/17 |
| 6,773,345 | B1 * | 8/2004 | Walker et al. | 463/17 |
| 2001/0012797 | A1 | 8/2001 | Walker et al. | 463/25 |
| 2001/0034720 | A1 * | 10/2001 | Armes | 705/65 |
| 2001/0039210 | A1 * | 11/2001 | ST-Denis | 463/42 |
| 2002/0002076 | A1 | 1/2002 | Schneier et al. | 463/29 |
| 2002/0025851 | A1 * | 2/2002 | Frankulin et al. | 463/29 |
| 2002/0046040 | A1 * | 4/2002 | Kirner | 705/1 |
| 2002/0073046 | A1 * | 6/2002 | David | 705/67 |
| 2002/0082995 | A1 * | 6/2002 | Christie, IV | 705/44 |

* cited by examiner

REMOTE WAGERING SYSTEM

RELATED APPLICATIONS

This application claims priority from U.S. Provisional Patent Application No. 60/306,000, filed Jul. 17, 2001.

TECHNICAL FIELD

The present invention relates to a method and system permitting remote wagering, while insuring that the wagerer is located in a jurisdiction permitting such wagering.

BACKGROUND OF THE INVENTION

Gambling is permitted only in certain jurisdictions in the United States, as well as other countries. In such jurisdictions, it is necessary to insure that the person placing the wager is, in fact, located within the jurisdiction.

The present invention is provided to solve this and other problems.

SUMMARY OF THE INVENTION

It is an object of the invention to provide a method for permitting a wagerer to remotely place a wager.

In accordance with the invention, the wagerer remotely contacts the establishment, and the system generates a random number. The system sends the random number to the wagerer via a local pager; and the wagerer either enters the random number into the system or verbally informs the ticket writer. Once the random number is verified by the system or the ticket writer, the wager is placed.

It is a further object of the invention to provide a system for permitting a wagerer to remotely place a wager.

In accordance with the invention, the system comprises means for permitting an automated betting system or a ticket writer to receive a remote communication from a wagerer, and means for the system to generate a random number. The system further comprises means for the sending of the random number to the wagerer via a local pager, means for permitting the wagerer to remotely contact the system or ticket writer, means for the system or ticket writer to verify the random number, and for means for instructing the system or ticket writer of the wagerer's desired wager.

DETAILED DESCRIPTION OF THE INVENTION

Figure 1:
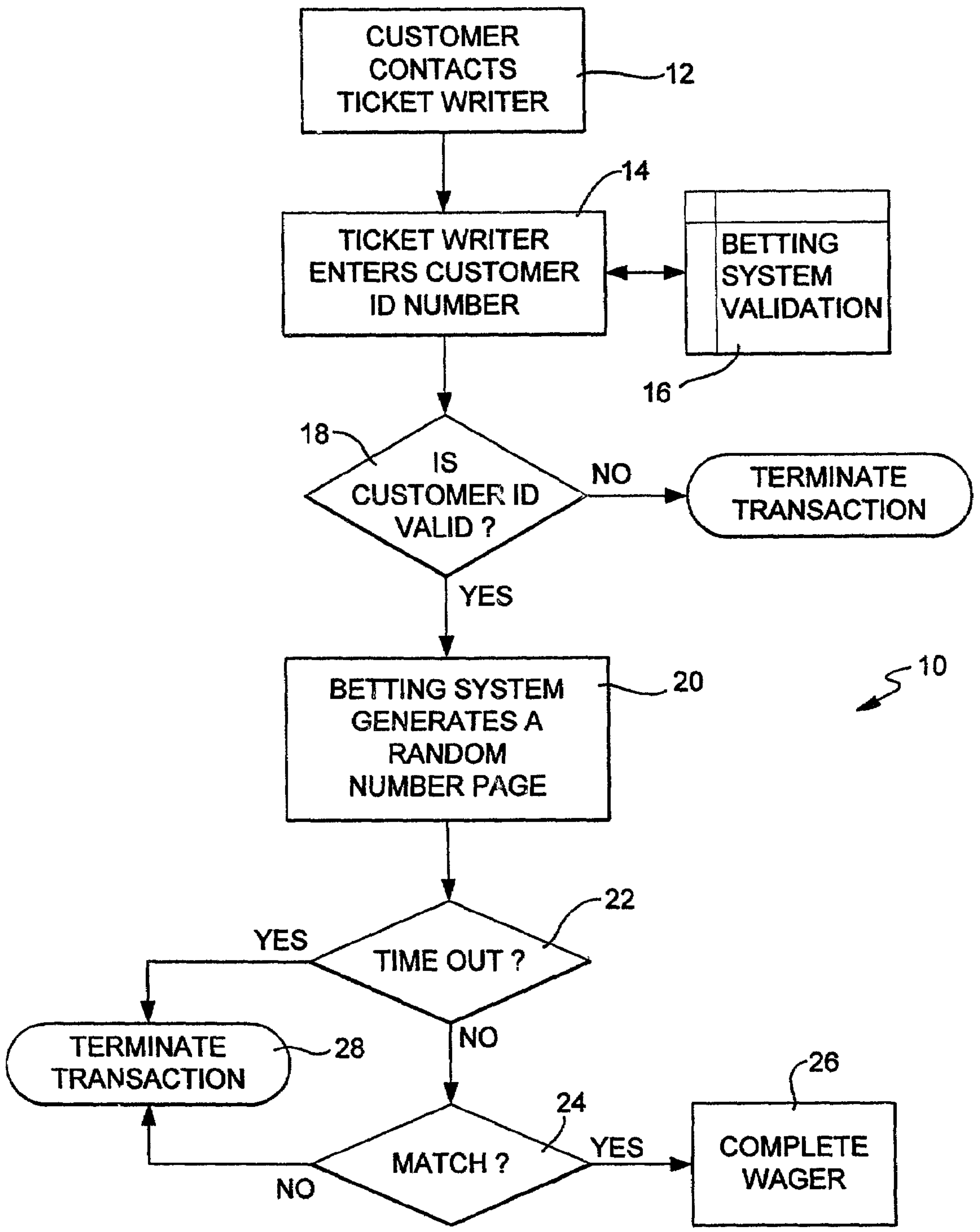
FIG. 1 is a flow chart illustrating the invention in manual mode.

While this invention is susceptible of embodiment in many different forms, there is shown in the drawings and will herein be described in detail the preferred embodiments of the invention with the understanding that the present disclosure is to be considered as an exemplification of the principles of the invention and is not intended to limit the broad aspect of the invention to the embodiment illustrated.

With this system, a customer is given a pager that only works within a limited jurisdiction where gambling is permitted, such as the Las Vegas valley. The customer remotely contacts his book, such as by telephone, over the Internet, over a closed-loop communications network, or other means of remote communication. When the customer remotely contacts the book to place a wager, the system generates a random 4- to 6-digit number. This number is then transmitted over the local area pager network to the customer; the customer must be physically located within the jurisdiction or the customer will not receive the page containing the random number. The customer must give the random number to the system or ticket writer, and the system or a ticket writer must verify the accuracy of the number, before the wager will be processed.

Manual Mode

FIG. 1 discloses a preferred method of wagering according to the invention in flowchart 10. In the first step, the customer remotely contacts the standard account wagering telephone number 12. The contact may be by telephone or other means of remote communication. For purposes of this discussion, the remote contact will be described as a telephone call.

The ticket writer inputs the customer's identification number into a terminal 14. The terminal sends the information to the Betting System for verification 16. Once verified 18, the Betting System generates a random 4- to 6-digit number 20. The Betting System transmits the random number simultaneously to the local pager broadcast tower via direct connection to the tower, or via Internet communications, for transmission to the customer's pager, and to the writer's terminal 20. After approximately 30 seconds, the local pager broadcast tower transmits the random number throughout the jurisdiction 20.

If the customer's pager is physically located within the range of the transmission, the pager will beep. The customer must then push a button on the pager to display the random number. The customer then gives the random number to the ticket writer. If the number supplied by the customer matches the number displayed on the terminal 24, the writer will complete the wager 26. If the number does not match 24, or if the number is not given within one minute 22, the call is terminated without a wager being accepted 28.

Semi-Automatic Mode

Figure 2:
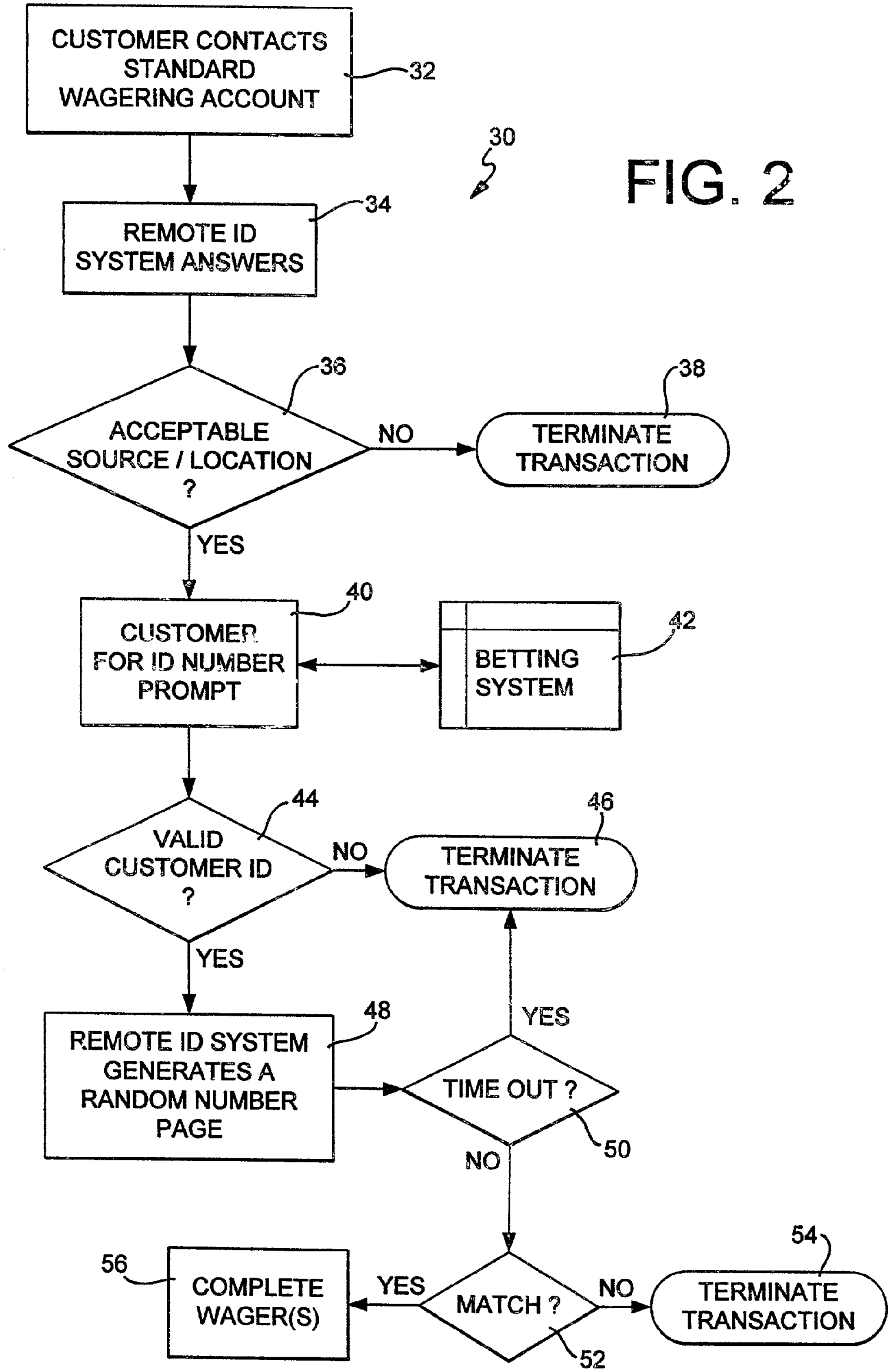
FIG. 2 is a flow chart illustrating the invention in semi-automatic mode.

FIG. 2 discloses another preferred method of wagering according to the invention in flowchart 30. In the first step, the customer remotely contacts the standard account wagering telephone number 32. The contact may be by telephone, over the Internet, or other means of remote communication. For purposes of this discussion, the remote contact will be described as a telephone call. The call will be answered by the Remote Identification System 34. The Remote Identification System has the ability to act as the first line of defense by eliminating the bulk of unwanted calls, i.e., from outside the jurisdiction, cell phones, schools, government offices, etc. If an unwanted call is detected 36, the Remote Identification System may terminate the call 38. If the Remote Identification System determines that the call is valid, then the Remote Identification System will instruct the customer to input his/her identification number via the telephone keypad 40.

The Remote Identification System will interface with the Betting System 42 to determine if the identification number is valid 44. If the number is not valid, the Remote Identification System will instruct the customer to re-enter the number; after three unsuccessful attempts, the call will be disconnected 46. If the number is valid, the Remote Identification System will generate a random 4- to 6-digit number and transmit the random number to the local pager broadcast tower via direct connection to the tower or via Internet communications 48. After approximately 30 seconds, the local pager broadcast tower transmits the random number throughout the jurisdiction.

If the customer's pager is physically located within the range of the transmission, the pager will beep. The customer must then push a button on the pager to display the random number. The customer then inputs the random number into the Remote Identification System via the telephone keypad. If the number input by the customer does not match the random number generated by the Remote Identification System 52, or if a number is not input within one minute 50, the call is terminated without a wager being accepted 54. If the number input by the customer matches the random number generated by the Remote Identification System 52, the customer is connected with a ticket writer via a second telephone line, i.e., the two telephone lines are patched together, and the ticket writer processes the wager 56.

Automatic Mode

Figure 3:
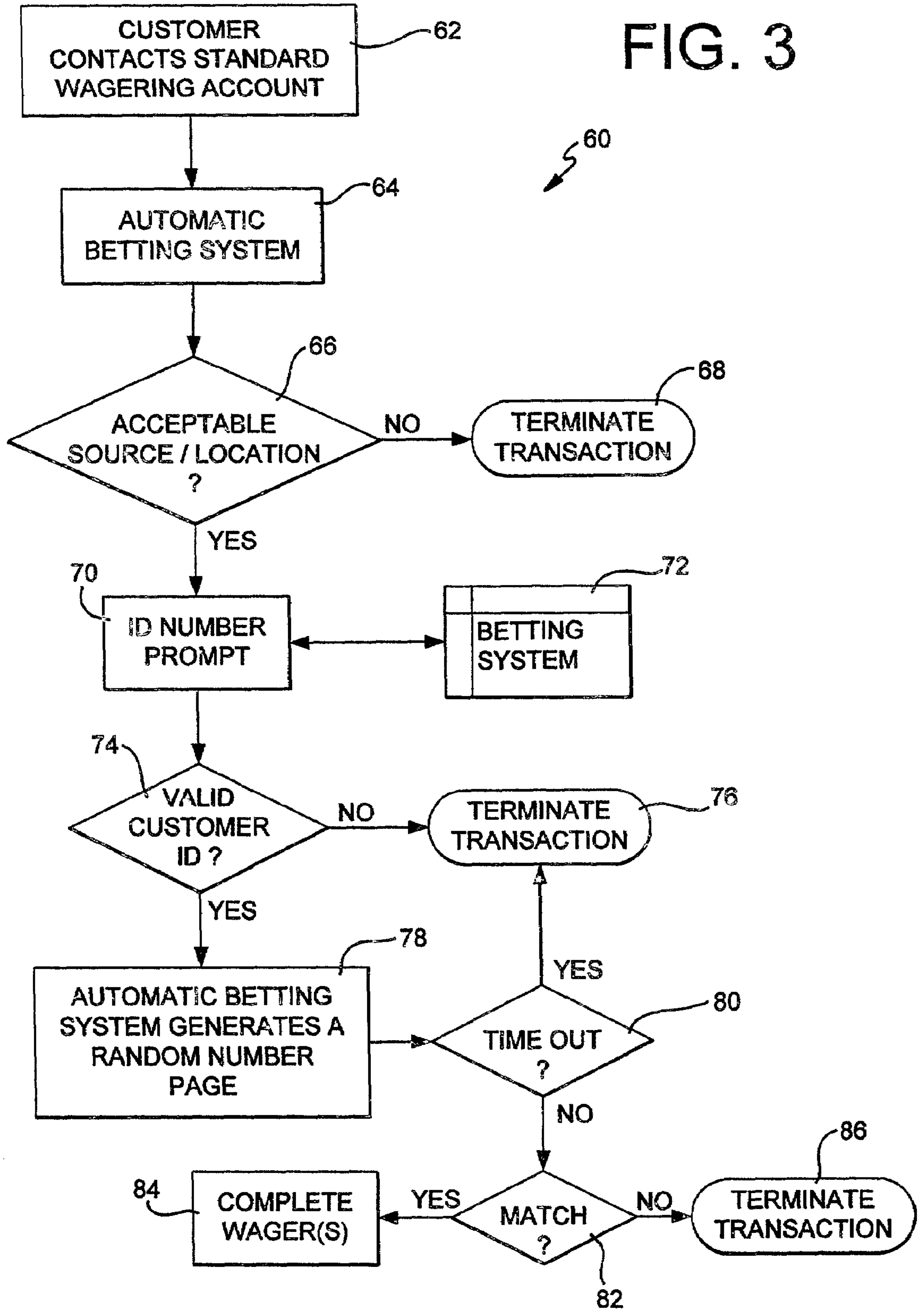
FIG. 3 is a flow chart illustrating the invention in automatic mode.

FIG. 3 discloses another preferred method of wagering according to the invention in flowchart 60. In the first step, the customer remotely contacts the standard account wagering telephone number 62. The contact may be by telephone, over the Internet, or other means of remote communication. For purposes of this discussion, the remote contact will be described as a telephone call. The call will be answered by the Automated Betting Interface 64. The Automated Betting Interface has the ability to act as the first line of defense by eliminating the bulk of unwanted calls, i.e., from outside the jurisdiction, cell phones, schools, government offices, etc. If an unwanted call is detected 66, the Automated Betting Interface may terminate the call 68. If the Automated Betting Interface determines that the call is valid, then the Automated Betting Interface will instruct the customer to input his/her identification number via the telephone keypad 70.

The Automated Betting Interface will interact with the Betting System 72 to determine if the identification number is valid 74. If the number is not valid, the Automated Betting Interface will instruct the customer to re-enter the number; after three unsuccessful attempts, the call will be disconnected 76. If the number is valid, the Automated Betting Interface will generate a random 4- to 6-digit number and transmit the random number to the local pager broadcast tower via direct connection to the tower or via Internet communications 78. After approximately 30 seconds, the local pager broadcast tower transmits the random number throughout the jurisdiction.

If the customer's pager is physically located within the range of the transmission, the pager will beep. The customer must then push a button on the pager to display the random number. The customer then inputs the random number into the Automated Betting Interface via the telephone keypad. If the number input by the customer does not match the random number generated by the Automated Betting Interface 82, or if a number is not input within one minute 80, the call is terminated without a wager being accepted 86. If the number input by the customer matches the random number generated by the Automated Betting Interface, the customer is connected directly to the Betting System and places the desired wager(s) without the assistance of a ticket writer 84.

While the specific embodiments have been illustrated and described, numerous modifications come to mind without significantly departing from the spirit of the invention and the scope of protection is only limited by the scope of the accompanying claims.

I claim:

1. A method for remotely placing a wager, comprising:

remotely receiving a first communication from a wagerer over a first telephone line, the first communication including customer identification information;

determining a wagerer phone type by an automated interface, the wagerer phone type being the type of phone from which the first communication was initiated;

automatically determining whether the wagerer phone type is a cellular phone;

if the wagerer phone type is a cellular phone, automatically terminating the first communication;

generating a random number by an automated interface;

automatically transmitting the random number to a pager of the wagerer;

remotely receiving a second communication from the wagerer, the second communication including a number;

comparing the number with the random number; and if the number is the same as the random number, patching the first telephone line with a second telephone line and accepting the wager from the wagerer over the patched telephone lines, wherein accepting the wager occurs after comparing the number with the random number.

2. The method of claim 1 wherein the random number comprises an alphanumeric character string.

3. The method of claim 1 wherein the random number comprises six digits.

4. The method of claim 1 wherein the random number comprises five digits.

5. The method of claim 1 wherein the random number comprises four digits.

6. The method of claim 1 wherein the random number is unrelated to a determination of the wager outcome.

7. The method of claim 1 wherein transmitting the random number to the pager of the wagerer comprises transmitting the random number to an intermediate connection, the intermediate connection transmitting the random number to the pager of the wagerer.

8. The method of claim 1 wherein the wagerer can only view the random number on the pager when the wagerer is located in a specific region.

9. The method of claim 1 wherein remotely receiving a first communication is performed by telephone.

10. The method of claim 1 wherein the pager only receives the random number when the pager is located in a particular region.

11. A method for preventing a wager comprising:

remotely receiving a first communication from a wagerer;

determining a wagerer location and a wagerer phone type by an automated interface, the wagerer location being the location from which the first communication was initiated;

automatically determining whether the wagerer location is one of a school, government office or outside gambling jurisdiction;

if the wagerer location is one of a school, government office or outside gambling jurisdiction, automatically terminating the first communication;

automatically determining whether the wagerer phone type is a cellular phone;

if the wagerer phone type is a cellular phone, automatically terminating the first communication;

if the wagerer location is not one of a school, government office or outside gambling jurisdiction and the wagerer phone type is not a cellular phone, generating a random number by the automated interface, the random number being unrelated to a determination of the wager outcome;

transmitting the random number to a pager of the remote wagerer; and remotely receiving a second communication from the wagerer, the second communication including a number, the number being unrelated to the determination of the wager outcome.

12. The method of claim 11 wherein remotely receiving a first communication is performed over the internet.

13. The method of claim 11 further comprising, if the number is the same as the random number, accepting a wager from the remote wagerer.

14. The method of claim 11 wherein receiving the first communication and receiving the second communication are performed on a single telephone call.

15. The method of claim 11 further comprising, if the number is the same as the random number, accepting a wager from the remote wagerer via an automated interface.

16. The method of claim 11 wherein the number is received via entry on a telephone keypad.

17. The method of claim 11 wherein the random number comprises between four and six digits.

18. The method of claim 11 wherein transmitting the random number to a pager of the remote wagerer comprises transmitting the random number via internet communications to a local pager broadcast tower.

19. A computer program for remote wagering comprising computer-executable code stored on a computer-readable medium for causing a computer to take steps comprising:

remotely receiving a first communication from a wagerer;

determining a wagerer phone type, the wager phone type being the type of phone from which the first communication was initiated;

determining whether the wagerer phone type is a cellular phone;

terminating the first communication in the event that the wagerer phone type is a cellular phone;

generating a random number, the random number being unrelated to the determination of the wager outcome;

transmitting the random number to a pager of the wagerer; and receiving a second communication from the wagerer, the second communication including a number.

20. The computer program comprising computer-executable code stored on a computer-readable medium of claim 19 for causing a computer to take steps further comprising:

comparing the number with the random number; and accepting a wager from the wagerer in the event that the number is the same as the random number.

* * * * *